(12) United States Patent
Zeng et al.

(10) Patent No.: US 8,322,023 B1
(45) Date of Patent: Dec. 4, 2012

(54) METHOD FOR PROVIDING A WRAP-AROUND SHIELD FOR A MAGNETIC RECORDING TRANSDUCER

(75) Inventors: Xianzhong Zeng, Fremont, CA (US); Yunhe Huang, Pleasanton, CA (US); Ling Wang, Hercules, CA (US); Hai Sun, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 613 days.

(21) Appl. No.: 12/615,544

(22) Filed: Nov. 10, 2009

(51) Int. Cl.
*G11B 5/127* (2006.01)
*H04R 31/00* (2006.01)

(52) U.S. Cl. .......... 29/603.16; 289/603.12; 289/603.14; 289/603.15; 289/603.18; 216/62; 216/65; 216/66; 360/121; 360/122; 360/317; 451/5; 451/41

(58) Field of Classification Search ............... 29/603.07, 29/603.12–603.16, 603.18; 216/22, 39, 41, 216/48, 62, 65, 66; 360/121, 123, 126, 317; 451/5, 41
See application file for complete search history.

(56) References Cited

U.S. PATENT DOCUMENTS

| | | | | |
|---|---|---|---|---|
| 7,086,138 | B2 * | 8/2006 | Anderson | 29/603.07 |
| 2007/0065683 | A1 * | 3/2007 | Sonoda et al. | 428/833.2 |
| 2007/0115584 | A1 | 5/2007 | Balamane et al. | |
| 2007/0211384 | A1 | 9/2007 | Hsiao et al. | |
| 2009/0144966 | A1 | 6/2009 | Zheng | |

* cited by examiner

*Primary Examiner* — Paul D Kim

(57) ABSTRACT

A method for fabricating a magnetic transducer is described. The magnetic transducer includes a pole having a pole tip and a flared region. The method Includes providing a first mask layer on the pole and providing a second mask layer on the first mask layer. The first mask layer is soluble in a predetermined solution and has a first thickness. The second mask layer has a second thickness greater than the first thickness. The method also includes forming a mask from the first mask layer and the second mask layer. The step of forming the mask layer includes using the predetermined solution. The mask has a pattern that exposes a portion of the pole tip and covers a portion of the flared region. The method also includes providing a wrap-around shield on at least the pole tip.

20 Claims, 7 Drawing Sheets

FIG. 10

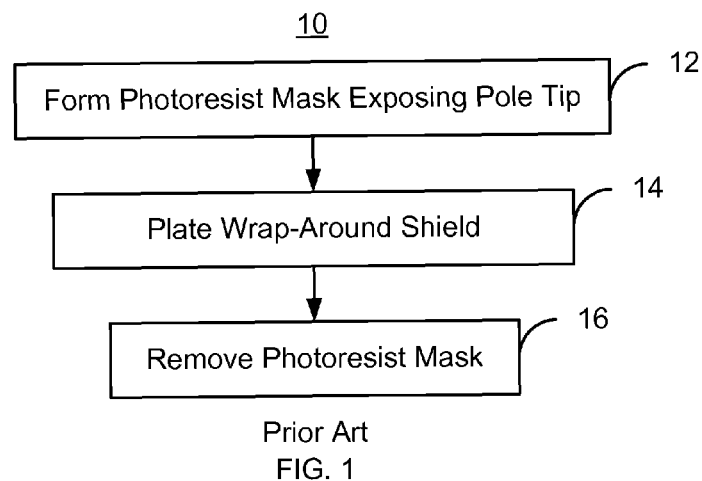
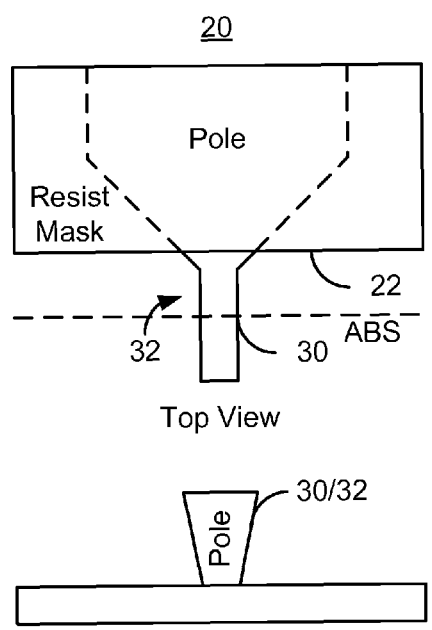
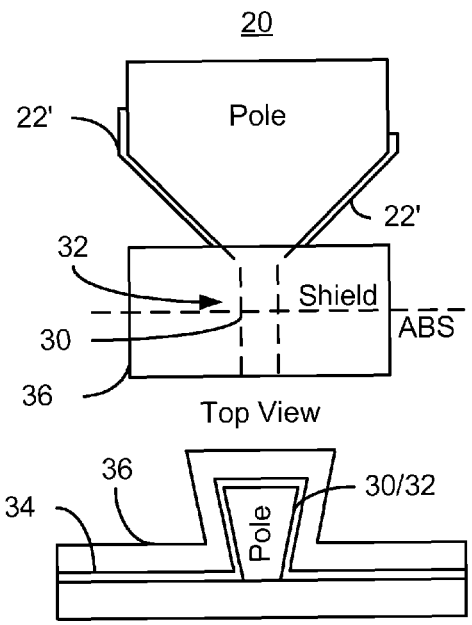

METHOD FOR PROVIDING A WRAP-AROUND SHIELD FOR A MAGNETIC RECORDING TRANSDUCER

BACKGROUND

FIG. 1 depicts a conventional method 10 for providing a wrap-around shield. FIGS. 2-3 depict top and air-bearing surface (ABS) views of a conventional magnetic recording transducer 20 during fabrication using the method 10. Referring to FIGS. 1-3, the method 10 commences after the pole has been formed. A photoresist mask that covers a portion of the pole is fabricated, via step 12. Step 12 simply includes providing a layer of photoresist directly on the conventional transducer 20, exposing portions of the photoresist layer to light, then immersing the photoresist in a developer. Thus, the portion of the photoresist layer that has been exposed to light is removed. FIG. 2 depicts the conventional transducer 10 after step 12 is completed. Thus, the pole 30 and photoresist mask 22 are shown. The pole 30 includes a pole tip region 32, which is exposed by the photoresist mask 22. The remaining portion of the pole 30 is, however, covered by the photoresist mask 22.

A wrap-around shield is provided, via step 14. Step 14 typically includes depositing a seed layer, then plating a magnetic shield. Finally, the photoresist mask 22 is removed. Typically, the photoresist mask 22 is stripped. FIG. 3 depicts the conventional magnetic transducer 10 after step 16 is performed. Thus, a wrap-around shield 36 has been provided on the pole 30. More specifically, the wrap-around shield 30 is provided on the pole tip 32 of the pole 30. In addition, a seed layer (not shown) for the wrap-around shield 30 may be provided. A gap layer 34 is also shown on the top of the pole tip 32 as well as on the sides. The gap layer 34 is nonmagnetic.

Although the conventional wrap-around shield 36 may be fabricated, there are drawbacks. In some regions of the magnetic transducer, a portion of the photoresist mask 22 may remain after fabrication of the wrap-around shield 36. This is shown in FIG. 3. After stripping of the photoresist mask 22, a portion 22' remains. This photoresist residue 22' may become trapped upon subsequent processing of the conventional magnetic transducer 10. Typically, the conventional magnetic transducer 20 is lapped to expose the ABS. Upon lapping, the photoresist residue 22' may result in defects in the conventional magnetic transducer 20. These defects may adversely affect performance and/or reliability of the conventional magnetic transducer 20. The photoresist residue 22' might be removed using a high dose of radiation. However, such methods may round the sidewalls of the conventional pole 30 and be unreliable in manufacturing.

Accordingly, what is needed is a system and method for improving the fabrication of a wrap-around shield for a magnetic recording transducer.

BRIEF SUMMARY OF THE INVENTION

A method for fabricating a magnetic transducer is described. The magnetic transducer includes a pole having a pole tip and a flared region. The method Includes providing a first mask layer on the pole and providing a second mask layer on the first mask layer. The first mask layer is soluble in a predetermined solution and has a first thickness. The second mask layer has a second thickness greater than the first thickness. The method also includes forming a mask from the first mask layer and the second mask layer. The step of forming the mask layer includes using the predetermined solution. The mask has a pattern that exposes a portion of the pole tip and covers a portion of the flared region. The method also includes providing a wrap-around shield on at least the pole tip.

BRIEF DESCRIPTION OF SEVERAL VIEWS OF THE DRAWINGS

FIG. 1 is a flow chart depicting a conventional method for fabricating a wrap-around shield.

FIG. 2 depicts a conventional magnetic transducer during fabrication.

FIG. 3 depicts a conventional magnetic transducer during fabrication.

DETAILED DESCRIPTION OF THE PREFERRED EMBODIMENTS

Figure 4:
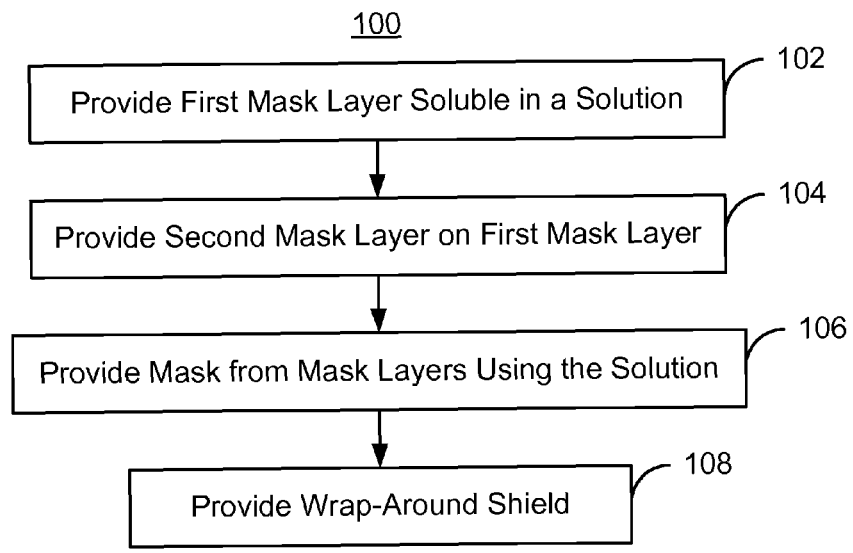
FIG. 4 is a flow chart depicting an exemplary embodiment of a method for fabricating a wrap-around shield for a magnetic recording transducer.

FIG. 4 is a flow chart depicting an exemplary embodiment of a method 100 for fabricating a wrap-around shield for a magnetic recording transducer. For simplicity, some steps may be omitted. Although described in the context of providing a single magnetic transducer, the method 100 may be used to fabricate multiple transducers at substantially the same time. The method 100 is also described in the context of particular structures. A structure or layer may include multiple materials and/or multiple sub-layers and may be formed using multiple sub-steps. The method 100 also may start after formation of other portions of the transducer. For example, the method 100 may commence after formation of a pole, coil(s), and shields. In some embodiments, the pole is trapezoidal in shape, as viewed from the ABS. As the magnetic transducer may be part of a merged head including a read transducer, the method 100 may start after formation of a read transducer.

A first mask layer is provided on the pole, via step 102. The first mask layer is soluble in a predetermined solution and has a first thickness. For example, the first mask layer may include a polydimethylglutarimide (PMGI) layer. PMGI is soluble in a developer used in photolithography. In some such embodiments, the first mask layer is composed of a PMGI layer. Thus, step 102 may include spin coating the PMGI layer, then baking the transducer. In some embodiments, the first mask layer is thin. For example, if PMGI is used, the first mask layer may be at least ten nanometers and not more than one hundred nanometers. In some such embodiments, the first mask layer is at least thirty nanometers and not more than sixty nanometers.

A second mask layer is provided on the first mask layer, via step 104. In some embodiments, the second mask layer is a photoresist layer. Thus, step 104 may include spinning on or otherwise depositing the photoresist. The second mask layer has a second thickness that may be greater than the first thickness of the first mask layer. For example, the second mask layer may have a thickness of two or more micrometers. Thus, if PMGI is used as described above, the second, photoresist mask layer is significantly thicker than the first, PMGI layer. In some embodiments, the second mask layer is at least twenty times thicker than the first mask layer. In other embodiments, however, other relationships between the thicknesses of the first and second mask layers may be allowed.

A mask is formed from the first mask layer and the second mask layer, via step 106. The mask formed exposes a portion of the pole tip, but covers a portion of the flared region of the pole, described below. The mask is a bi-layer mask including the first mask layer and the second mask layer. Formation of the mask in step 106 includes use of the predetermined solution in which the first mask layer is soluble. For example, for a second, photoresist mask layer, step 106 may include exposing portions of the second mask to light, then immersing at least part of the transducer in developer. Thus, the portions of the second mask layer that have been exposed to light are removed. Further, PMGI is soluble in the developer. Thus, exposed portions of the PMGI may also be removed. Consequently, a mask including the remaining portions of the PMGI layer and the photoresist layer is formed.

A wrap-around shield is provided, via step 108. Also in step 108, a write gap may be provided. The wrap-around shield fabricated in step 108 is magnetic. Step 108 may include depositing seed layer(s) and plating the magnetic material(s) for the wrap-around shield. The wrap-around shield is separated from the pole tip by at least a write gap and a side gap. Stated differently, although in proximity to the pole, the wrap-around shield is spaced apart from the pole so that the wrap-around shield and pole do not share an interface. Fabrication of the magnetic transducer may then be completed. For example, additional structures such as other coil(s), poles, and shields may be formed. As part of completing formation of the transducer, the mask formed using the method 100, including remaining portions of the first and second mask layers, is removed.

Using the method 100, a transducer having a wrap-around shield may be fabricated. Furthermore, the presence residue from the second mask layer, particularly photoresist residue, may be avoided. The first mask layer is soluble in a solution. Consequently, immersion of the mask in the solution removes the first mask layer. The removal may be complete even for a pole such as those used in perpendicular magnetic recording (PMR), in which the top of the pole is wider than the bottom of the pole. As a result, defects in the transducer at the ABS and the attendant degradation in performance and/or reliability may be avoided.

Figure 5:
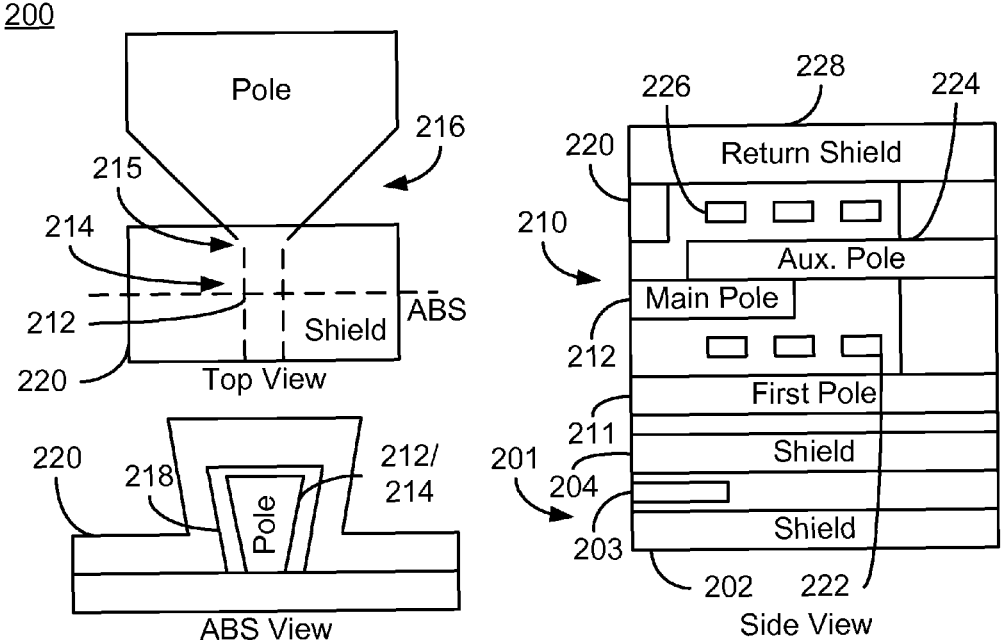
FIG. 5 depicts top, ABS, and side views of an exemplary embodiment of a magnetic recording head having a wrap-around shield.

For example, FIG. 5 depicts top, ABS, and side views of an exemplary embodiment of a magnetic head 200 having a wrap-around shield and that may be formed using the method 100. For clarity, FIG. 5 is not to scale. The head 200 includes a read transducer 201 and a write transducer 210. The read transducer 201 includes shields 202 and 204 and read sensor 203, such as a giant magnetoresistive (GMR) or tunneling magnetoresistive (TMR) sensor.

The magnetic write transducer 210 includes a first pole 211, a main pole 212, a gap 218, a wrap-around shield 220, an auxiliary pole 224, a return shield 228, and coils 222 and 226. Note that in other embodiments, at least some of these components may be configured differently or omitted. In other embodiments, other components (not shown) may be added.

The pole 212 includes a pole tip 214, a flare point 215, and a flared region 216. The wrap-around shield 220 may be formed using the method 100 and covers the pole tip 214. During fabrication of the wrap-around shield 220, at least part of the flared region 216 is covered by a mask (not shown in FIG. 5) having first and second layers. Thus, this portion of the pole 212 is not covered by the wrap-around shield 220. After fabrication of the wrap-around shield 220 is complete, the mask is removed. The predetermined solution may be used to remove the first layer of the mask. Because the first mask layer is soluble in the predetermined solution, immersion in the predetermined solution may result in complete removal of the first layer of the mask. For example, a PMGI layer used as the first mask layer may be removed by immersion in the same developer as was used in forming the mask in step 106. Thus, performance and reliability issues due to such residue may be mitigated or avoided. Although use of the developer in step 106 may result in an undercut in the mask, the first mask layer may be thin in comparison to the second mask layer. Thus, the undercut does not adversely affect fabrication of the head 200.

Figure 6:
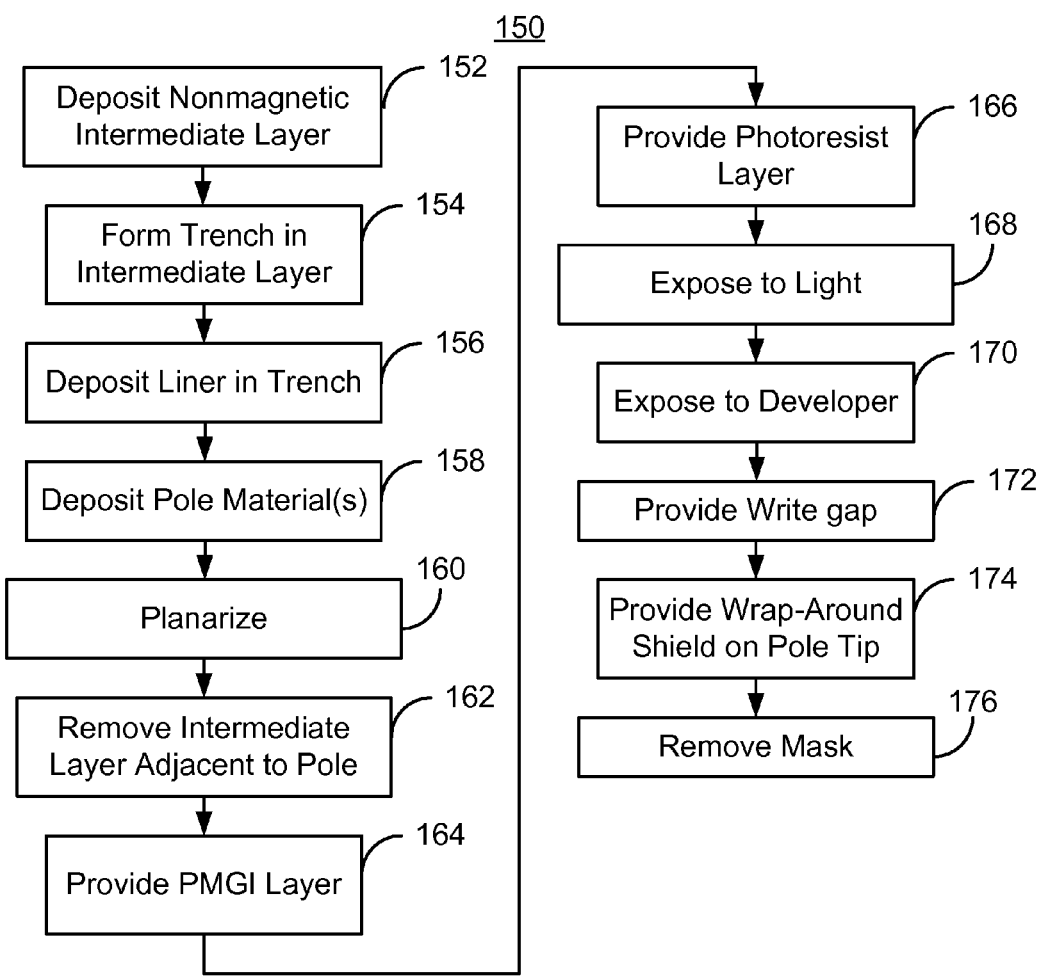
FIG. 6 is a flow chart depicting another exemplary embodiment of a method for fabricating a wrap-around shield for a magnetic recording transducer.

FIG. 6 is a flow chart depicting another exemplary embodiment of a method 150 for fabricating a wrap-around shield for a magnetic recording transducer. For simplicity, some steps may be omitted. FIGS. 7-13 depict top, ABS, and flared region views of an exemplary embodiment of a magnetic recording transducer 250 having a wrap-around shield during fabrication using the method 150. FIGS. 7-13 are not drawn to scale. The method 150 is described in the context of providing a single magnetic transducer 250. However, the method 150 may be used to fabricate multiple transducers at substantially the same time. The method 150 and magnetic transducer 250 are also described in the context of particular structures. A structure or layer may include multiple materials and/or multiple sub-layers and may be formed using multiple sub-steps. The method 150 also may start after formation of other portions of the transducer 250. As the magnetic transducer 250 may be part of a merged head including a read transducer, the method 150 may start after formation of a read transducer.

Figure 7:
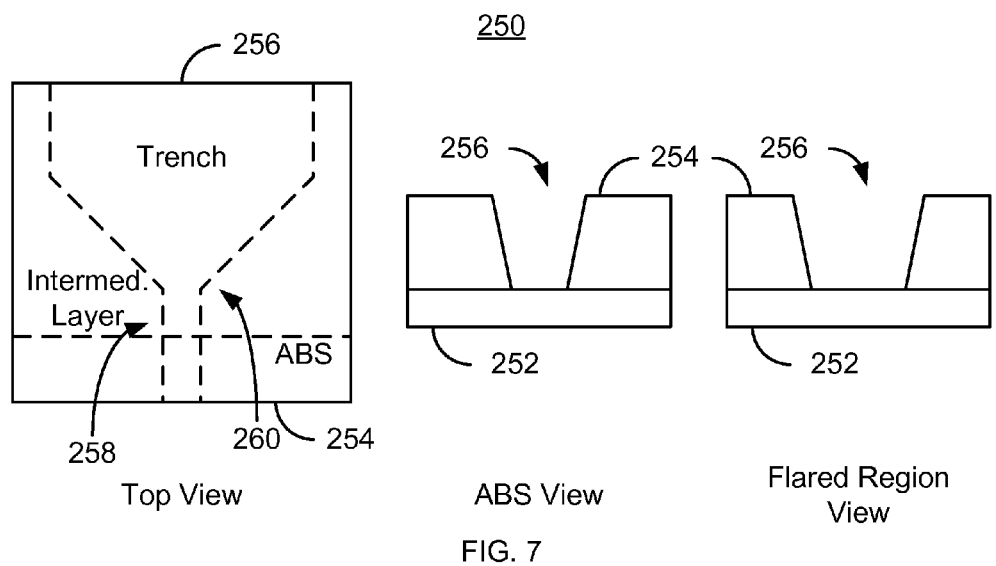
FIGS. 7-13 depicts top, ABS, and flared region views of an exemplary embodiment of a magnetic recording transducer having a wrap-around shield during fabrication.

A nonmagnetic intermediate layer is deposited, via step 152. In some embodiments, the nonmagnetic layer is aluminum oxide. A trench is formed in the nonmagnetic layer, via step 154. Step 154 typically includes forming a mask having an aperture above the desired location of the pole, then removing the exposed portion of the nonmagnetic intermediate layer. For example, an aluminum oxide reactive ion etc (RIE) might be used. FIG. 7 depicts the transducer 250 after step 154 is performed. Thus, an intermediate layer 254 having a trench 256 therein is shown. The trench 256 has the desired profile of the pole. Consequently, the top of the trench 256 is wider than the bottom. In addition, the trench 256 has the desired configuration. Thus, the trench 256 has a nose region 258 and a flare point 260 corresponding to the desired configuration of the pole. The intermediate layer 254 resides on an underlayer 252 that may be an etch stop layer used in formation of the trench 256.

Figure 8:
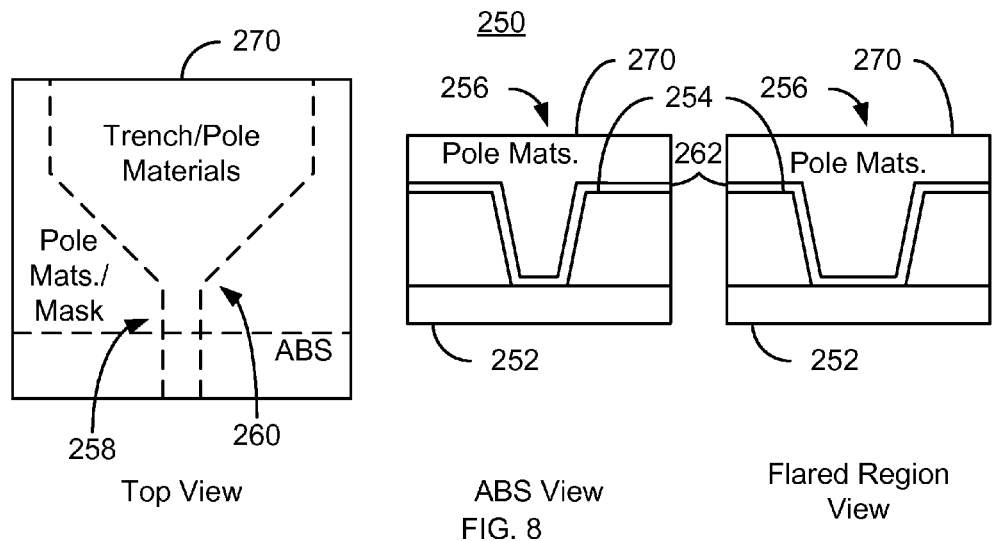

A liner that may be nonmagnetic, such as Ru, may be deposited in the trench, via step 156. The pole materials are also deposited, via step 158. The liner may also act as a seed layer for pole materials that may be plated in step 158. The pole materials are magnetic. FIG. 8 depicts the magnetic transducer after step 158 is performed. Thus, the liner 262 and pole materials 270 are shown. The magnetic transducer 250 is planarized, via step 160. For example, a chemical mechanical polish (CMP) may be performed. The pole may thus be formed.

Figure 9:
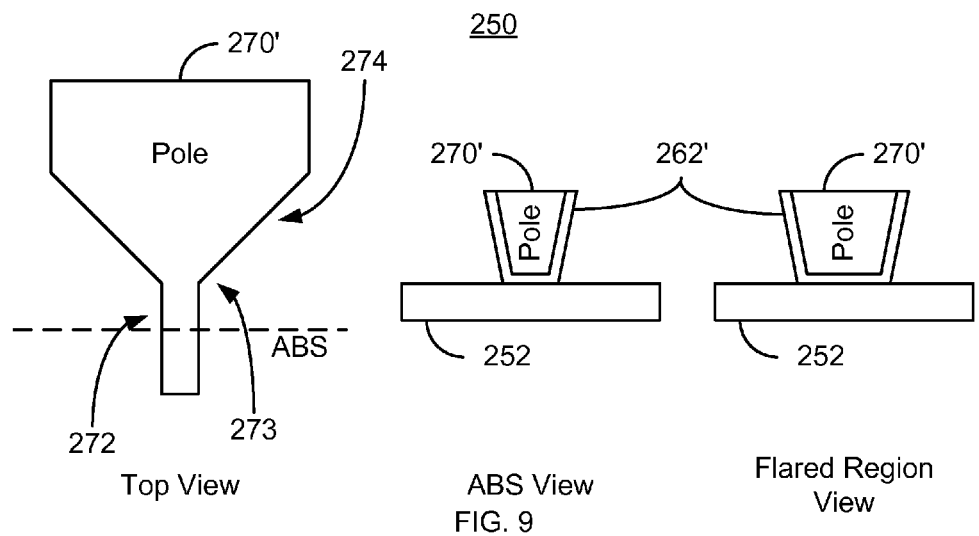

The portion of the intermediate layer 254 adjacent to the pole is removed, via step 162. This portion of the intermediate layer adjoins the liner 262, if present. As a result, space is made for the wrap-around shield being formed. FIG. 9 depicts the magnetic transducer 250 after step 162 is performed. Thus, the pole 270' and liner 262' are shown.

Figure 10:
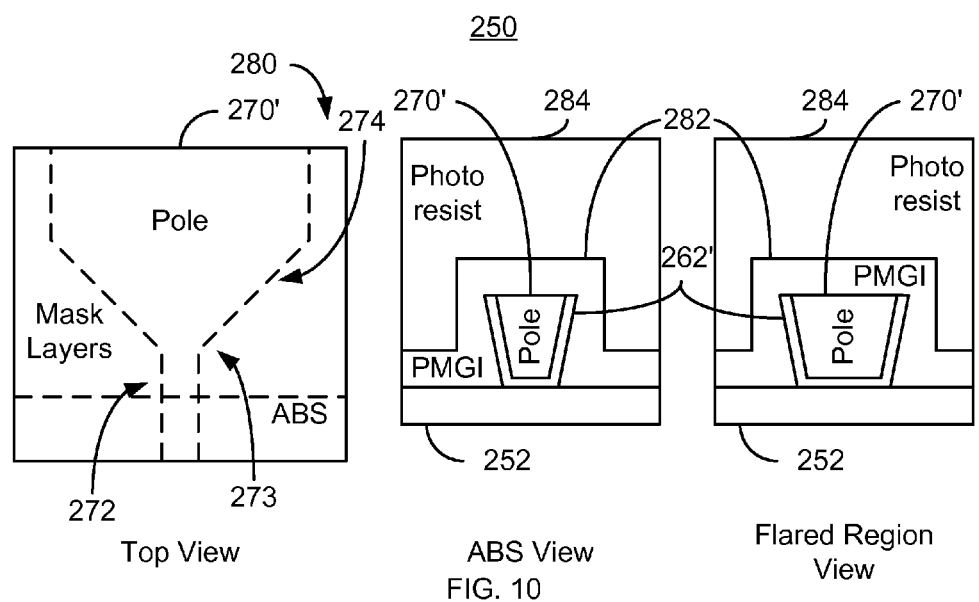

A PMGI layer is provided on the pole 270', via step 164. In some embodiments, step 164 includes spin coating and then baking the PMGI layer. This PMGI layer is to form the first layer of the mask used in fabrication of the wrap-around shield. In some embodiments, the PMGI layer is at least ten nanometers thick and not more than approximately one hundred nanometers thick. In some such embodiments, the PMGI layer is at least twenty and not more than sixty nanometers thick. A photoresist layer is provided on the PMGI layer, via step 166. In some embodiments, step 166 includes spin coating and curing the photoresist layer. The photoresist layer provided is significantly thicker than the PMGI layer. For example, the photoresist layer may be at least one micron thick. In some such embodiments, the photoresist layer is two microns thick or more. In some embodiments, the photoresist layer is sensitive to light in the deep ultraviolet range. FIG. 10 depicts the transducer 250 after step 166 is performed. Thus, the first, PMGI layer 282 and the second photoresist mask layer 284 are shown. Together, the PMGI layer 282 and photoresist mask layer 284 form mask layers 280.

Figure 11:
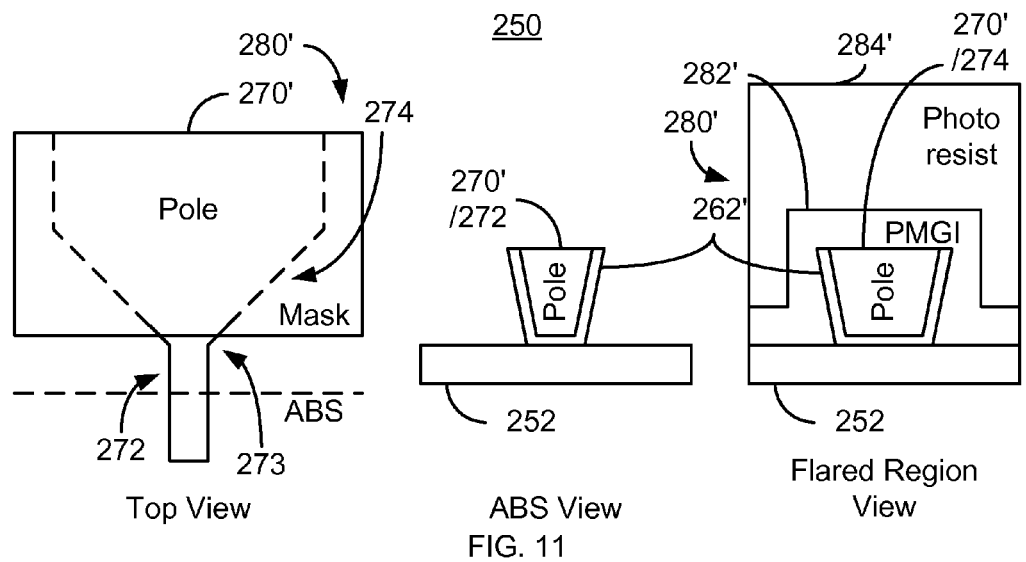

Portions of the photoresist layer 284 are exposed to light in the wavelength range to which the photoresist layer 284 is sensitive, via step 168. The mask layers 280 are then exposed to developer, via step 170. Consequently, the portions of the photoresist layer that were exposed to light in step 168 are removed in step 170. In addition, because the PMGI layer 282 is soluble in the developer, the portions of the PMGI layer 272 exposed to the developer through the removal of part of the photoresist layer 282 are also removed. Consequently, a mask is formed. FIG. 11 depicts the transducer 250 after step 170 is performed. Thus, the photoresist mask 280' covers a portion of the flared region 274 of the pole, but exposes the flare point 273 and the pole tip 272. As can be seen in the ABS view and flared region view, the pole tip 272 is exposed, while much of the flared region 274 is covered by the mask 284'. Note that the mask 290' may have a slight undercut (not shown) because the PMGI is soluble in the developer. Because the thickness of the PMGI layer 284 is small in comparison to that of the photoresist layer 294', such an undercut may not significantly affect processing.

Figure 12:
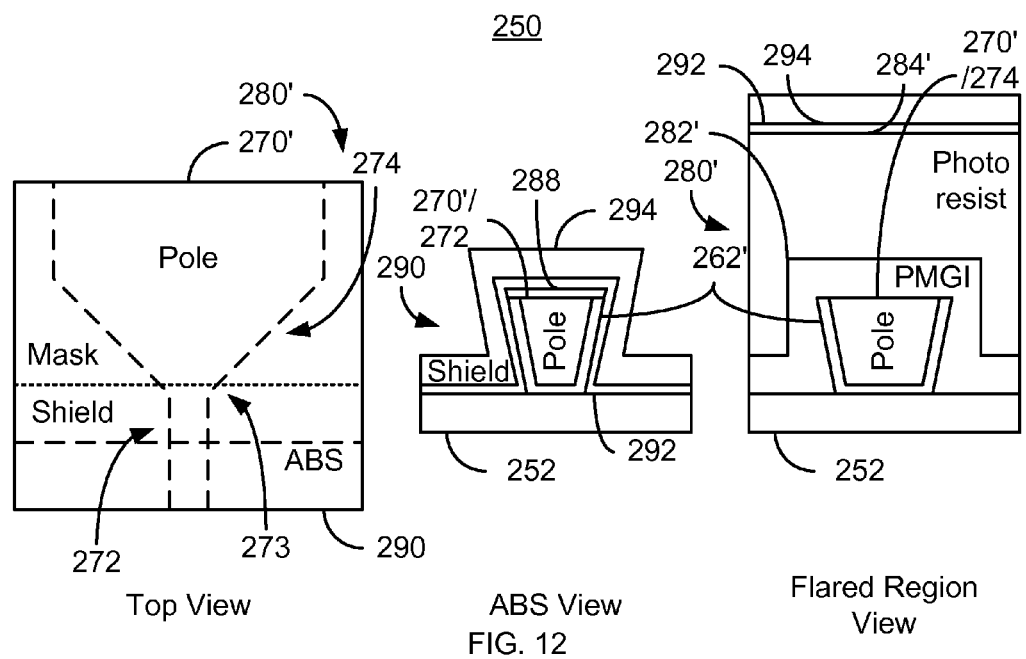

A write gap may be provided, via step 172. Step 172 may include depositing a nonmagnetic layer that may be insulating or metallic. In some embodiments, side gaps may also be provided in step 172. Although described as being provided after steps 164-170 and before steps 174-176, the write gap may be provided at another time. A wrap-around shield may also be provided, via step 174. Step 174 may include depositing a seed layer, for example via plating. Magnetic layer(s) may then be provided on the seed layer also in step 174. In some embodiments, the magnetic layer(s) are plated. FIG. 12 depicts the transducer 250 after step 174 is performed. Thus, a write gap 288 is shown. The wrap-around shield layers 290 are also shown. The wrap-around shield layers 290 include a magnetic layer 294 and a seed layer 292, which may or may not be magnetic. As can be seen in FIG. 12, the shield layers 290 have been deposited over the pole tip 272 as well as the flared region 274. Thus, in the top view of the transducer 250, a dotted line depicts the edge of the mask 280'.

Figure 13:
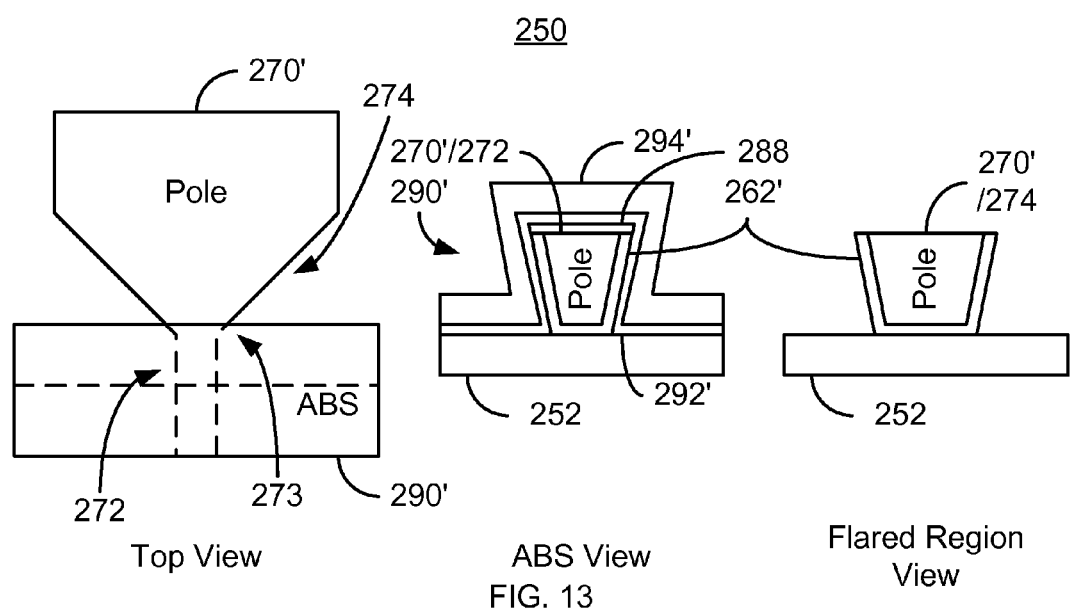

The mask 280' is removed, via step 176. Step 176 may include stripping the photoresist layer 284'. In addition, it may be ensured in step 176 that the PMGI layer 282' is removed. For example, the magnetic transducer may be immersed in the developer in which the PMGI layer 282' is soluble. FIG. 13 depicts the magnetic transducer 250 after step 176 is performed. Thus, the shield 290' including seed layer 292' and magnetic layer 294' are shown, while the mask 280' has been removed. The shield 290' covers the pole tip 272, but exposes the portion of the flared region 274 previously covered by the mask 280'. Fabrication of the transducer 250 may then be completed. For example, other structures such as coils and return poles may be provided. In addition, the transducer 250 may be lapped to expose the ABS.

Using the method 150, a transducer 250 having a wrap-around shield 290' may be fabricated. Furthermore, residue from the photoresist layer 284' may be avoided. Instead, the first PMGI layer is soluble in and removed by the developer. As a result, defects in the transducer 250 at the ABS may be reduced. Consequently, performance of the transducer 250 may be improved.

We claim:

1. A method for fabricating a magnetic transducer having a pole including a pole tip and a flared region, the method comprising:
    providing a first mask layer on the pole, the first mask layer being soluble in a predetermined solution and having a first thickness;
    providing a second mask layer on the first mask layer, the second mask layer having a second thickness greater than the first thickness;
    forming a mask from the first mask layer and the second mask layer, the step of forming the mask layer comprising using the predetermined solution, the mask having a pattern exposing a portion of the pole tip and covering a portion of the flared region; and
    providing a wrap-around shield on at least the pole tip.

2. The method of claim 1 wherein the first mask layer includes a polydimethylglutarimide (PMGI) layer.

3. The method of claim 1 wherein the second mask layer is a photoresist mask layer.

4. The method of claim 3 wherein the step of forming the mask further includes:
    exposing a portion of the second mask layer to light; and
    immersing the portion of the second mask layer and a portion of the mask layer in a developer to remove immersed portions of the first mask layer and the second mask layer.

5. The Method of claim 4 wherein after removing the immersed portions, the exposed portion of the pole tip is free of photoresist residue.

6. The method of claim 1 wherein the predetermined solution is a developer.

7. The method of claim 1 wherein the pole includes a plurality of sides, wherein the magnetic transducer further includes a nonmagnetic layer on at least the plurality of sides of the pole and wherein the step of providing the wrap-around shield further comprising:
    depositing a magnetic layer on the nonmagnetic layer.

8. The method of claim 7 wherein the step of depositing the magnetic layer further comprising:
    electroplating the magnetic layer.

9. The method of claim 1 wherein the first thickness is at least ten nanometers.

10. The method of claim 9 wherein the first thickness is not more than one hundred nanometers.

11. The method of claim 1 wherein the first thickness is at least thirty nanometers and not more than fifty nanometers.

12. The method of claim 1 wherein the second thickness is at least two micrometers.

13. The method of claim 1 further comprising:
    removing the mask after the wrap-around shield is provided.

14. The method of claim 13 wherein after removing the mask, the pole is free of photoresist residue.

15. The method of claim 1 wherein the step of providing the first mask layer further comprises spin coating the first mask layer.

16. The method of claim 1 wherein the pole has a bottom and a top wider than the bottom.

17. The method of claim 1 further comprising:
depositing a write gap before the wrap-around shield is provided.

18. The method of claim 1 further comprising:
depositing a nonmagnetic intermediate layer;
forming a trench in the nonmagnetic intermediate layer;
providing a liner, a portion of the liner residing in the trench;
depositing at least one pole material;
planarizing the at least one pole material to form the pole; and
removing a portion of the nonmagnetic intermediate layer adjoining the liner.

19. The method of claim 1 wherein the second thickness is at least twenty times the first thickness.

20. A method for fabricating a magnetic transducer having a pole including a pole tip and a flared region, the pole tip having a bottom and a top wider than the bottom, the method comprising:
providing a polydimethylglutarimide (PMGI) layer over the pole, the PMGI layer having a first thickness of at least ten nanometers and not more than sixty nanometers;
providing a photoresist layer on the PMGI layer, the photoresist layer having a second thickness of at least one micrometer;
exposing a portion of the photoresist layer above the pole tip to light;
exposing the photoresist layer and the PMGI layer to a developer, the PMGI layer being soluble in the developer such that the portion of the photoresist layer and a portion of the PMGI layer under the portion of the photoresist layer is removed;
depositing a write gap; and
providing a wrap-around shield on the pole tip.

* * * * *